US009810338B2

(12) United States Patent
Carter

(10) Patent No.: US 9,810,338 B2
(45) Date of Patent: Nov. 7, 2017

(54) GAS CYLINDER VALVE

(71) Applicant: LUXFER CANADA, LTD., Calgary (CA)

(72) Inventor: Stephen Alan Carter, Calgary (CA)

(73) Assignee: LUXFER CANADA, LTD., Calgary, AB (CA)

(*) Notice: Subject to any disclaimer, the term of this patent is extended or adjusted under 35 U.S.C. 154(b) by 0 days.

(21) Appl. No.: 15/001,413

(22) Filed: Jan. 20, 2016

(65) Prior Publication Data
US 2016/0238151 A1 Aug. 18, 2016

Related U.S. Application Data

(63) Continuation-in-part of application No. 14/600,567, filed on Jan. 20, 2015.

(51) Int. Cl.
*E03B 1/00* (2006.01)
*F16K 27/06* (2006.01)
*F16K 5/06* (2006.01)

(52) U.S. Cl.
CPC .......... *F16K 27/067* (2013.01); *F16K 5/0642* (2013.01); *F16K 5/0647* (2013.01);
(Continued)

(58) Field of Classification Search
CPC .... F16K 5/0694; F16K 5/0689; F16K 17/003; F16K 17/168; F16K 17/38; F16K 5/06;
(Continued)

(56) References Cited

U.S. PATENT DOCUMENTS 2,479,737 A * 8/1949 Garretson ............... F16K 1/305
137/317
3,367,623 A * 2/1968 Piel .......................... F16K 5/06
251/144

(Continued)

FOREIGN PATENT DOCUMENTS

| CN | 201137732 | 10/2008 |
| GB | 1241717 | 8/1971 |

(Continued)

OTHER PUBLICATIONS

Parker Seals™ Parker O-ring Handbook Catalog ORD 5700A/US, pp. 4-5, 4-6, copyright 1999, 2001 Parker Hannifin Corp.

(Continued)

*Primary Examiner* — R. K. Arundale
(74) *Attorney, Agent, or Firm* — Abel Law Group LLP

(57) ABSTRACT

A valve for connection to a pressurized gas cylinder includes a housing including a gas cylinder aperture which is connectable to a gas cylinder, and a housing conduit which extends through the housing from the gas cylinder aperture to one or more inlet/outlet apertures so that the valve is capable of providing fluid communication between the gas cylinder through the housing conduit and the one or more inlet/outlet apertures. A flow control ball within the housing conduit is movable between open and closed positions. Ball seals have sealing surfaces corresponding to a shape of the flow control ball for substantially sealing the flow control ball in the housing conduit. Other features include components for mounting the ball seals though one of the inlet/outlet apertures; components for mounting a stem to the flow control ball including bearings; live ports; a tube which can be removably connectable from the rest of the housing; provision for receiving an EFV and/or a PRD in the valve (Continued)

housing; and at least one of the ball seals and stem bearings comprising polyetherimide or polyaryletherketone.

27 Claims, 7 Drawing Sheets

(52) U.S. Cl.
CPC .......... *F16K 5/0663* (2013.01); *F16K 5/0668* (2013.01); *F16K 5/0684* (2013.01); *F16K 5/0694* (2013.01); *Y10T 137/87917* (2015.04)

(58) Field of Classification Search
CPC .... F16K 5/0605; F16K 5/0673; F16K 5/0678; F16K 5/20; F16K 5/201; Y10T 137/7869; Y10T 137/87917
USPC ................. 137/468, 517, 72; 138/40; 222/3; 251/315.01, 314, 315.1; 285/148.19, 390
See application file for complete search history.

(56) References Cited

U.S. PATENT DOCUMENTS

| | | | |
|---|---|---|---|
| 3,645,291 | A | 2/1972 | Finney |
| 3,918,481 | A | 11/1975 | Doe et al. |
| 6,189,531 | B1 | 2/2001 | Tatarek |
| 6,217,003 | B1* | 4/2001 | Shafer .................... F16K 5/0673 |
| | | | 251/171 |
| 6,647,982 | B1 | 11/2003 | Zaiser et al. |
| 7,070,208 | B2* | 7/2006 | Richey .................... F16L 41/10 |
| | | | 285/179 |
| 7,635,113 | B2* | 12/2009 | Bearer .................... F16K 5/0678 |
| | | | 251/174 |
| 2002/0189679 | A1* | 12/2002 | Avis ........................ F16K 17/30 |
| | | | 137/462 |
| 2008/0115576 | A1* | 5/2008 | Marstorp .................. F16K 5/06 |
| | | | 73/199 |
| 2011/0284784 | A1* | 11/2011 | Abel ...................... F16K 5/0689 |
| | | | 251/180 |
| 2013/0049360 | A1* | 2/2013 | Wolff ...................... F16L 15/04 |
| | | | 285/347 |
| 2014/0318651 | A1 | 10/2014 | Harris | |

FOREIGN PATENT DOCUMENTS

| | | |
|---|---|---|
| JP | 2010001558 A | 1/2010 |
| JP | 2014214804 | 11/2014 |
| WO | 2012096501 A2 | 7/2012 |
| WO | 2014063559 A1 | 5/2014 |
| WO | 2014174759 A1 | 10/2014 |
| WO | 2016086308 A1 | 6/2016 |

OTHER PUBLICATIONS

Search Report for GB1421663.4 dated Jan. 15, 2015.
Engineers Edge. "O-Ring Installation Design and Specification for Dynamic/Reciprocating Applications." Accessed Jan. 29, 2015. http://www.engineersedge.com/general_engineering/oring_gland_size_dynamic_cylinder.htm.
ACT Expo trade show, May 4-7, 2014; and 114 turn valve—Model MPP-250-5.
"Ball Valves: General Purpose and Special Application." Swagelok. http://www.swagelok.com.
Attached Information for Consideration concerning confidential sales before the filing date.
International Search Report for PCT/CA2015/051267 (now WO2016/086308) dated Feb. 17, 2016, 4 pgs.

* cited by examiner

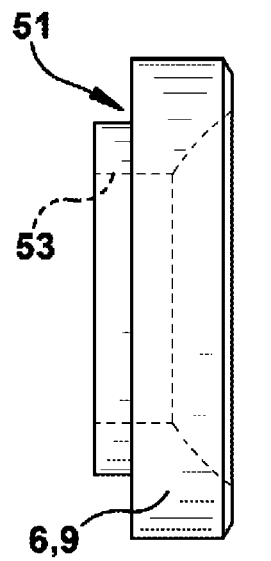 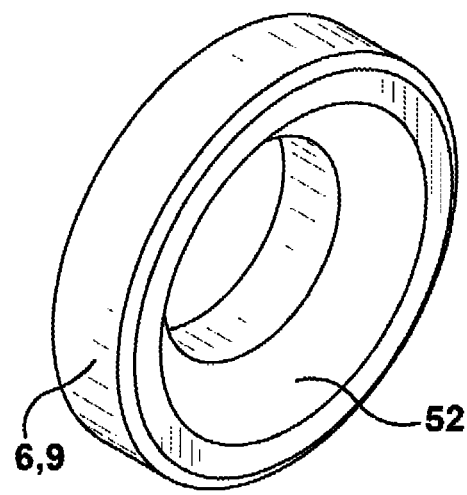
Figure 5A     Figure 5B
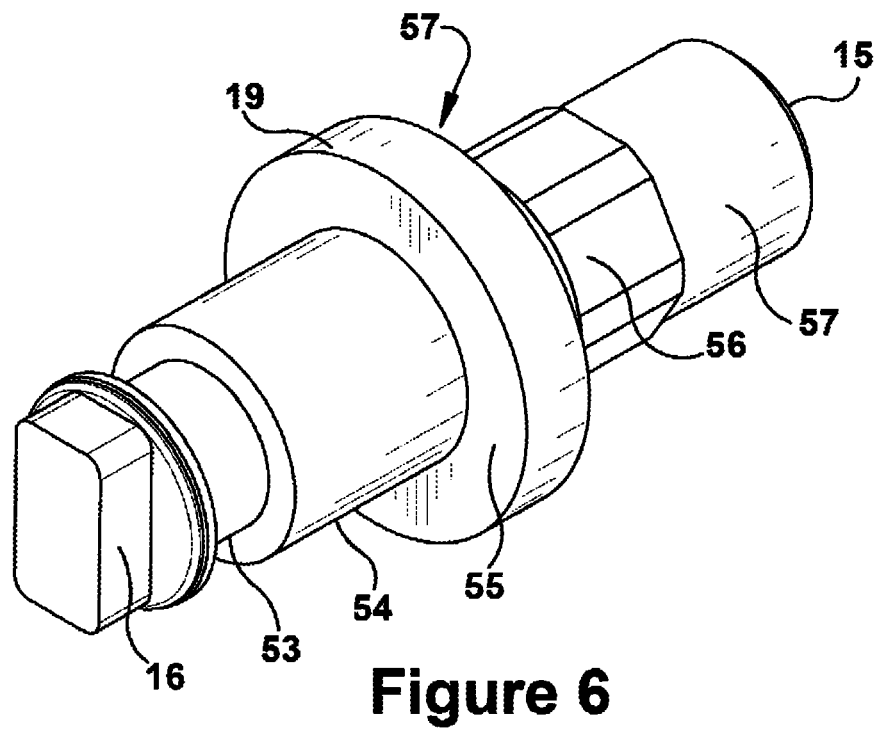
Figure 6

GAS CYLINDER VALVE

CROSS REFERENCE OF RELATED APPLICATIONS

The present application is a continuation-in-part of U.S. patent application Ser. No. 14/600,567, filed Jan. 20, 2015, entitled "Gas Cylinder Valve", naming inventor Stephen Alan Carter, the disclosure of which is incorporated herein by reference.

TECHNICAL FIELD

This disclosure relates to a valve for a pressurized gas cylinder.

BACKGROUND

In the field of high pressure gas cylinders, it is well-known to fit valves onto such cylinders in order to provide a closable opening to the cylinder. Such cylinders tend to contain gases such as natural gas or hydrogen, and can also be used to contain other gases such as nitrogen, helium, argon or air. The valve can be opened to allow either the filling or emptying of the gas cylinder, and then can be closed again once this operation is complete.

A disadvantage with these valves, which are generally made of brass or steel, is the inefficiency of the flow of the gas through the valve. One way of quantifying the efficiency of a particular valve is to calculate its net discharge coefficient. This is calculated as follows (by reference to know prior art valves). For example, the OMB™ Beta New valve has a 7 mm orifice (i.e., the cross-section of the narrowest part of the conduit through the valve) with a filling flow equal to a 5.194 mm ideal orifice. The net $C_D$ is calculated as $(5.194)^2/(7)^2=55\%$. Similarly, the VTI™ valve V-VTK905 has a 5.8 mm orifice with filling flow equal to a 4.42 mm ideal orifice. Thus, the net $C_D$ is $(4.42)^2/(5.8)^2=58\%$.

There is therefore a need in the art to provide valves with improved flow characteristics, while also meeting the high safety standards required of such high pressure gas cylinder valves. It is also desirable to seek to improve the seals provided in such valves, for example to improve the lifetime and performance of the seals.

SUMMARY OF THE DISCLOSURE

One aspect of the disclosure features a valve for connection to a pressurized gas cylinder, the valve including the following features. A housing includes a gas cylinder aperture which is connectable to a gas cylinder, and a housing conduit which extends through the housing from the gas cylinder aperture to one or more inlet/outlet apertures so that the valve is capable of providing fluid communication between the gas cylinder through the housing conduit and the one or more inlet/outlet apertures. A flow control ball within the housing conduit is movable from a closed position in which it substantially seals the housing conduit to an open position which provides fluid communication through the housing conduit between the cylinder aperture and the one or more inlet/outlet apertures. Ball seals have sealing surfaces corresponding to a shape of the flow control ball for substantially sealing the flow control ball in the housing conduit. The ball seals are comprised of a polymeric material including polyetherimide or polyaryletherketone. The housing is formed at least partially from aluminum.

Referring now to specific features of the first aspect of the disclosure, the housing conduit can include a threaded bore extending from one of the inlet/outlet apertures that terminates in a flat bottom. An exteriorly threaded seal retainer engages the threads of the threaded bore and contacts the flat bottom. A seal is disposed between the seal retainer and an adjacent one of the ball seals. Another feature includes a threaded fastener that can engage the threads of the threaded bore in contact with the seal retainer for locking the seal retainer in position. Yet another feature is a shim that can be disposed between the retainer and the adjacent one of the ball seals, wherein the seal is an O-ring and the shim compresses the O-ring by a desired amount.

Another specific feature of the first aspect of the disclosure is a valve stem for turning the flow control ball between the open position and the closed position, wherein the flow control ball can include a rectangular notch that is engaged by a rectangular portion of the valve stem.

In yet another specific feature the valve can include a valve stem for turning the flow control ball between the open position and the closed position. A valve bore is in communication with the housing conduit. The stem extends through the valve bore. The stem includes a stem flange. At least one O-ring is disposed between the stem and the valve bore for substantially sealing the stem to the valve bore. A threaded stem retainer engages threads formed in the housing around the valve bore and includes a shoulder and an opening in the shoulder that receives the stem. A stem bearing is disposed around the stem between an interior facing surface of the stem flange and the housing. A thrust bearing is disposed around the stem between an exterior facing surface of the stem flange and the shoulder of the stem retainer.

Regarding a further specific feature, the valve can be adapted to be used with the valve cylinder containing natural gas or hydrogen.

Other specific features are that the stem bearing and the thrust bearing can be comprised of polymeric material including polyetherimide or polyaryletherketone. More particularly, the stem bearing, the thrust bearing and the ball seals are comprised of a polymeric material including polyether ether ketone (PEEK) polymer, carbon, graphite and polytetrafluoroethylene.

In other specific features a handle can be mounted to the valve stem adapted to rotate the valve stem and the flow control ball by 90 degrees. The valve can include at least one live port extending transverse to the housing conduit.

Another specific feature includes a tube which can be removably connectable from the rest of the housing. The tube has a first threaded end portion that engages threads of a component of the gas cylinder and a second threaded end portion of finer threads that engage a threaded portion of the gas cylinder aperture. A mounting surface is adapted to be engaged by a tool for rotating the tube. A fastener has threads that engage the finer threads for locking the tube and the housing together at a desired position of the housing.

Other features include the housing conduit including an excess flow bore, comprising an excess flow valve (EFV) provided in the excess flow bore. In a further feature the housing conduit can communicate with a thermal pressure relief aperture, comprising a thermal pressure relief device (PRD) fitted into the pressure relief aperture.

A second aspect of the disclosure is a valve for connection to a pressurized gas cylinder, the valve including the following features. A housing includes a gas cylinder aperture which is connectable to a gas cylinder, and a housing conduit which extends through the housing between the gas cylinder aperture and one or more inlet/outlet apertures so that the valve is capable of providing fluid communication between the gas cylinder through the housing conduit and the one or more inlet/outlet apertures. A flow control ball within the housing conduit is movable from a closed position in which it substantially seals the housing conduit to an open position which provides fluid communication through the housing conduit between the cylinder aperture and the one or more inlet/outlet apertures. B all seals have sealing surfaces corresponding to a shape of the flow control ball for substantially sealing the flow control ball in the housing conduit. The housing conduit includes a threaded bore extending from one of the inlet/outlet apertures that terminates in a flat bottom. An exteriorly threaded seal retainer engages the threads of the threaded bore and contacts the flat bottom. An O-ring is disposed between the seal retainer and an adjacent one of the ball seals. A threaded fastener engages the threads of the threaded bore in contact with the seal retainer for locking the seal retainer in position. A valve bore is in communication with the housing conduit. A valve stem extends through the valve bore for turning the flow control ball between the open position and the closed position. The stem includes a stem flange. At least one O-ring is disposed between the stem and the valve bore for substantially sealing the stem to the valve bore. A threaded stem retainer engages threads formed in the housing around the valve bore and includes a shoulder and an opening in the shoulder that receives the stem. A stem bearing is disposed around the stem between an interior facing surface of the stem flange and the housing and a thrust bearing is disposed around the stem between an exterior facing surface of the stem flange and the shoulder of the stem retainer.

The following pertain to specific features of the second aspect of the disclosure. The valve can be adapted to be used with the valve cylinder containing natural gas or hydrogen. Another feature is that the valve can be adapted to be used with the gas cylinder at pressures of up to 700 bar. Another specific feature is that the housing can be formed at least partially from aluminum.

Other specific features are that the stem bearing, the thrust bearing and the ball seals can be comprised of polymeric material including polyetherimide or polyaryletherketone and, more particularly, polyether ether ketone (PEEK) polymer, carbon, graphite and polytetrafluoroethylene.

In other specific feature, a handle can be mounted to the valve stem adapted to rotate the valve stem and the ball by 90 degrees. Yet another feature is that the valve can include at least one live port extending transverse to the housing conduit.

Another specific feature is directed to a tube which can be removably connectable from the rest of the housing. The tube has a first threaded end portion that engages threads of a component of the gas cylinder and a second threaded end portion of finer threads that engage a threaded portion of the gas cylinder aperture. A mounting surface is adapted to be engaged by a tool for rotating the tube. A fastener has threads that engage the finer threads for locking the tube and the housing together at a desired position of the housing.

Other specific features include the housing conduit including an excess flow bore, comprising an excess flow valve (EFV) provided in the excess flow bore. A further feature is wherein the housing conduit can communicate with a thermal pressure relief aperture, comprising a thermal pressure relief device (PRD) fitted into the pressure relief aperture.

Another feature pertains to a shim that can be disposed between the seal retainer and the adjacent one of the ball seals for compressing the O-ring by a desired amount.

Yet another feature is that the flow control ball can include a rectangular notch that is engaged by a rectangular portion of the valve stem.

It should be appreciated that any of the specific features discussed above may be employed in any combination in connection with the first and second aspects of the disclosure. In addition, it is contemplated that any of the features discussed below in the Detailed Description may be employed in the first and second aspects of the disclosure in any combination.

In this disclosure, the term "proximal" is used to refer to a part of the valve that is closest to the gas cylinder aperture and furthest from the handle or lever, while the term "distal" is used to refer to a part of the valve that is distant from the gas cylinder aperture. In this disclosure reference to apertures means openings in an exterior surface of the housing of the valve which may include internal features in the valve, while ports or conduit indicate passageways in the valve between apertures.

In particular, the housing of this disclosure can be formed from aluminum, more specifically, substantially entirely from aluminum. In conventional valves for pressurised gas cylinders, the housing (and indeed the entire valve) is normally made of brass. Steel is also used conventionally. It has been surprisingly found by the inventor that forming the housing from aluminum can provide several advantages over these prior art materials. For example, aluminum is of lower density than brass, meaning that the valves of the present disclosure can weigh around 50-60% less than prior art brass valves. In addition, aluminum has better thermal conductivity than the prior art materials. This thermal conductivity has been found by the inventor to be particularly useful in the valves of the disclosure. This is because the temperature of, for example, natural gas can drop to −105° C. during the filling of a cylinder. O-rings can be used in the valves of the present disclosure to substantially seal various parts of the valve. Natural gas compatible O-rings have a −50° C. low temperature operational limit. By forming the housing from aluminum, the improved thermal conductivity between the gas and the external (e.g., room) temperature means that the O-rings are less likely to be cooled to such low temperatures, meaning that leakage at low temperatures can be less of a problem in the valves of the present disclosure.

In particular, it is advantageous for the ball seals, the stem bearing and/or the thrust bearing to be comprised at least partially of a polymer selected from polyetherimide or polyaryletherketone, more specifically, substantially entirely from a polymer selected from a polyetherimide or polyaryletherketone. A suitable polyetherimide is ULTEM®. A suitable polyaryletherketone is polyether ether ketone (PEEK). One advantageous PEEK material is PEEK HPV which includes PEEK polymer, carbon, graphite and polytetrafluoroethylene. It has been surprisingly found by the inventor that these materials provide particularly advantageous properties for the ball seals, bearing and/or thrust bearing, including low thermal expansion coefficient, high tensile and compressive strengths, low friction, excellent machinability, low water absorption; and good compatibility with the target gases (e.g., natural gas, hydrogen).

In a particular feature, between the gas cylinder aperture and the part of the housing conduit which is sealed by the closure member in the closed position, the housing conduit forms a path which turns through approximately 90 degrees. In particular, between the part of the housing conduit which is sealed by the closure member in the closed position and each live port, the housing conduit forms a path which turns through approximately 90 degrees.

More particularly, the gas cylinder aperture communicates with a tube which is removably connectable from the rest of the housing. The tube preferably comprises a gas cylinder aperture at its proximal end, a tube aperture at its distal end for connection to the cylinder aperture on the housing in order to provide fluid connection to the housing conduit, and a tube conduit which provides fluid communication between the gas cylinder aperture and the tube aperture. Specifically, the removable connection can be provided by a screw thread on the external surface of the tube which is suitable for engaging a corresponding screw thread of the cylinder aperture of the housing in order to provide fluid communication between the housing conduit and the tube conduit. The screw thread on the external surface of the tube is preferably provided with a nut for screwing against the housing and locking it into position.

In particular, between the screw thread on the external surface of the tube and the distal end of the tube there is provided a portion of the tube with a narrower external diameter than the screw thread onto which is fitted an O-ring in order to provide a substantial seal between the tube and the housing. In particular the O-ring can form a rod gland seal. The tube can comprise a section of hexagonal external cross-section, suitable for engaging with a wrench. Particularly, the section of hexagonal external cross-section has a larger external diameter than the rest of the tube. More specifically, the tube can be provided with an O-ring on the external surface of the tube on the proximal side of the section of hexagonal external cross-section such that it abuts that section in order to provide a substantial seal between the valve and the gas cylinder in use. The proximal end of the tube can include threads that engage threads of a component of the gas cylinder.

In some embodiments, the housing may additionally comprise the thermal pressure relief aperture. This aperture is in fluid connection with the housing conduit and is shaped such that the thermal pressure relief device (PRD) may be fitted into the aperture. The fitting can be formed by providing a screw thread on an internal wall of the aperture which is suitable for engaging a corresponding screw thread on an external surface of the PRD. In this way, the PRD can be substantially sealed in the thermal pressure relief device aperture.

As is known in the art, thermal pressure relief valves are used to protect high-pressure gas cylinders in the event of a fire. Thermal pressure relief valves are generally closed in normal use, but have a means of opening when the pressure and/or temperature inside the cylinder increases to a certain level (for example, as a result of the cylinder being heated by a fire) to allow the contents of the cylinder to be vented. In this way, the possibility of the cylinder exploding can be substantially reduced.

In some embodiments, the excess flow valve (EFV) may be provided in the excess flow bore portion of the housing conduit. As is known in the art, excess flow valves are used as a safety feature in the field of gas cylinders. Under normal gas flow through the housing conduit, the EFV allows substantially unrestricted flow of gas through the conduit. However, if an excessively high flow rate occurs, a mechanism within the EFV triggers and normally prevents further flow of gas through the conduit until the unsafe condition is resolved.

Advantages of the valve of this disclosure are that it is lightweight, robust, low torque, low leakage, indexable, and functions as a ¼ turn cylinder valve. When constructed of aluminum, the ball valve weighs about ½ of current valves. One suitable material for the housing of this disclosure is 6061 aluminum (compared to conventional stainless steel). Another advantage is that the valve of this disclosure exhibits very low torque to operate, on the order of 7% to 26% of current products. Yet another advantage is that the ball seals used in the valve of this disclosure actually survive the specified temperatures and pressures. In contrast, most current products fail their seals upon reaching 85° C. and full pressure. Another aspect is that the stem and bearing system of the present valve is installed from outside the valve. Current stems are inserted from a center of the valve. Indexable valve stud and jam nut of the present valve allow 370° rotational positioning of the valve. For example, the stud has 4.6 to 5.7 full threads engaging the valve head. That is, the valve head can be turned up to 370° to get it in the desired angular location and still have 4.6 full threads engaged. The head is then locked in place by the jam nut.

High technology bearing and seal polymeric materials of the present valve permit low torque, long life and low leakage. Another advantage is that the internal ball-retainer system of the present valve eliminates a second leak site and on the order of about 60% of the potential leakage area.

Further comparisons of the present valve compared to current products are as follows. The flow control ball of the present valve can have a diameter of 15.5 mm compared to 24 mm, which reduces load by 58%. The rectangular ball-drive tang is employed in the present valve compared to an arc'd keyway. Peek HPV polymeric material can be employed for the ball seals of the present valve compared to Acetal or Teflon. Employing an internal ball/seal retainer eliminates use of a 1″ seal found in conventional valves. The stem is externally loaded in the present valve and the retainer is piloted, compared to installation through the ball bore. Peek HPV polymeric material can be used for the stem bearing and thrust washer in the present valve compared to Acetal. The present valve can employ the EFV which is tamperproof as a result of the design positioning the EFV in the interior of the valve, and high flow, compared to no provision for an EFV in a ¼ turn ball valve. The present valve can employ a PRD. In contrast, manufacturers of conventional valves do not provide a PRD; their valves have only a threaded stud or port and they expect the end user to find a suitable PRD.

The present valve can employ an indexable stud with rod seals (compared to an SAE style nut with washer). The present stud can have alternate stud sizes. The present valve can include a pressure recovery section between the cylinder aperture and housing conduit discussed below, which is lacking in conventional valves. The present valve can have a high Cd on the order of 94%, for example, compared to on the order of 59% with conventional valves. The present valve can employ a live port which is lacking in conventional valves.

Many additional features, advantages and a fuller understanding of the disclosure will be had from the accompanying drawings and the Detailed Description that follows. It should be understood that the above Summary of the Disclosure describes the subject matter herein in broad terms while the following Detailed Description describes the subject matter herein more narrowly and presents specific embodiments that should not be construed as necessary limitations of the subject matter as defined in the claims.

BRIEF DESCRIPTION OF THE DRAWINGS

FIGS. 5A and 5B are side and perspective views, respectively, of a ball seal of this disclosure;

FIG. 6 is a perspective view from a proximal end portion of a stem used in the valve of this disclosure;

DETAILED DESCRIPTION

Figure 1:
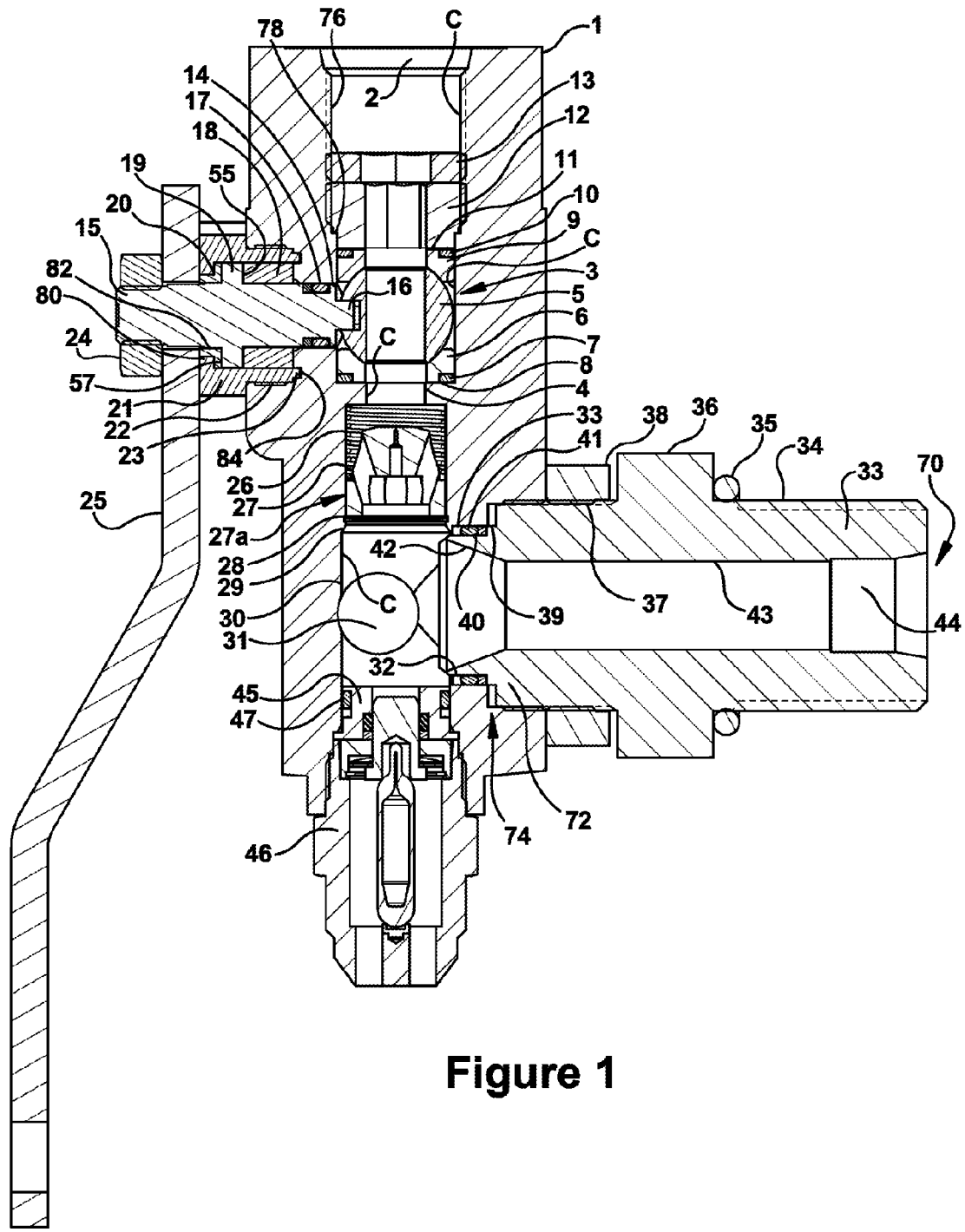
FIG. 1 is a cross-sectional view of the valve of this disclosure.
Figure 2:
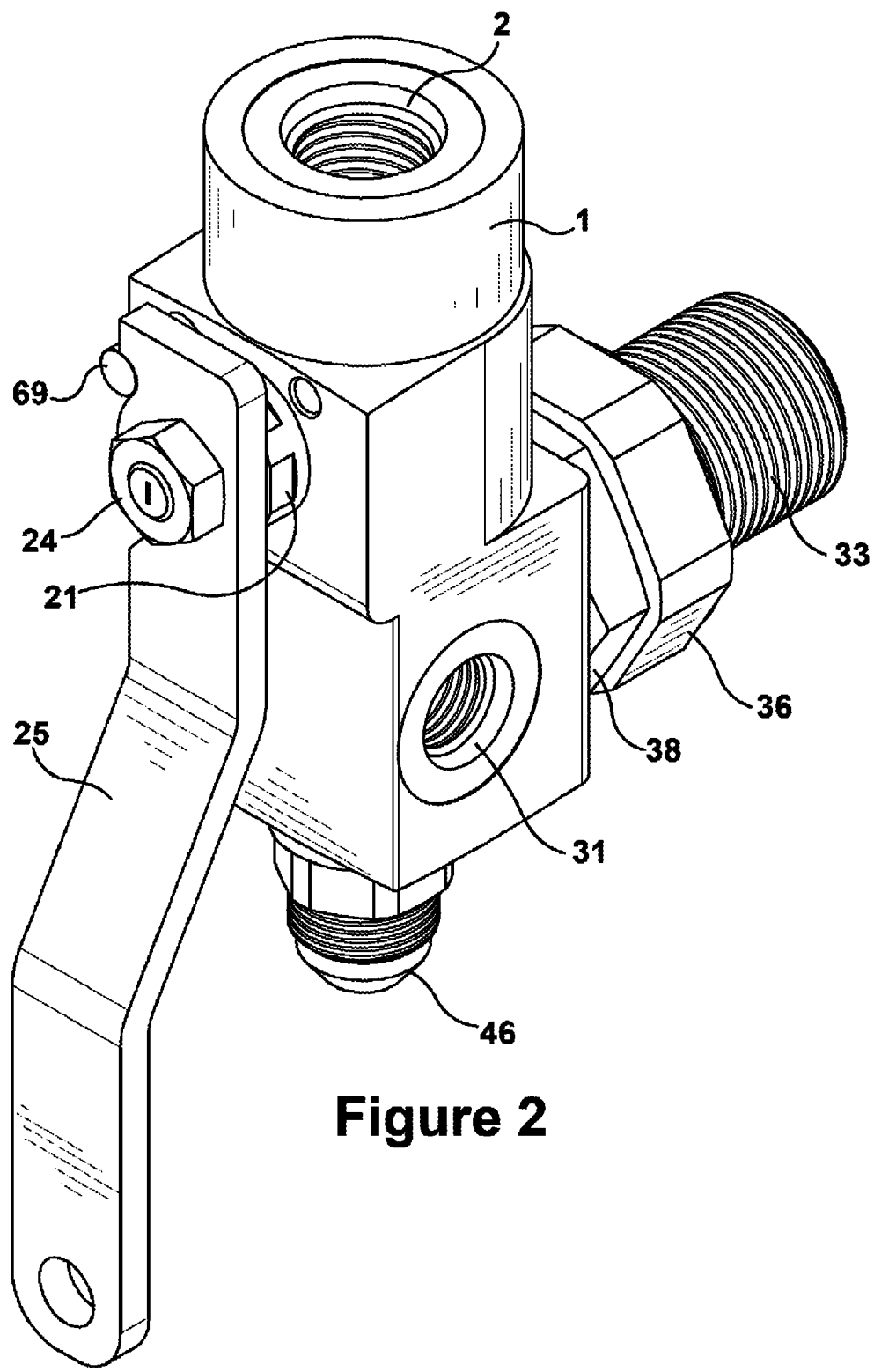
FIG. 2 is a perspective view of the valve of this disclosure.

Referring to FIGS. 1 and 2, a housing or valve body 1 is in particular comprised of aluminum, for example, 6061 aluminum (or equivalent). The valve body is attached to an O-ring sealed, removable tube or threaded tube or stud 33 which mounts the valve into a mating high pressure container (e.g., a gas cylinder). The stud comprises a gas cylinder aperture 70 at its proximal end, a tube aperture 72 at its distal end for connection to a cylinder aperture 74 of the housing in order to provide fluid connection to the housing conduit C, and a tube conduit which provides fluid communication between the gas cylinder aperture and the tube aperture. In particular, the stud has an indexing feature allowing the valve body 1 to be rotated within a range (such as 370°) for optimal positioning. The stud 33 has exterior threads 34 at the proximal end portion of the stud which mate with or engage interior threads of the pressure cylinder. The same valve can be mounted to various cylinder necks by simply changing the stud to one with appropriate threads and sealing features. That stud interchangeability minimizes proliferation of the more complex and more expensive valve bodies.

For example, currently natural gas and hydrogen cylinders (200 to 700 bar) have 4 neck thread sizes: 1⅛"-12 UNF; 1½"-12 UNF; 1¾"-12 UN; and 2"-12 UN. The stud 33 has a second, finer-pitch thread 37 which mates with or engages a companion thread in the cylinder aperture of the valve body 1 (as shown 1⅛"-24 UNS). This finer thread mates the valve to the stud and provides the rotational adjustment feature. A finer pitch is chosen to minimize the uncertainty in the valve body's axial position due to adjustment position. For example, 1 turn of a 24TPI thread creates an axial change of 1.058 mm.

The stud has a shoulder 39 and minor sealing diameter 40 which provide two of the surfaces for a rod-style O-ring gland. The outer gland surface is formed by bore 33 in the valve body. The bore 33 is part of the housing conduit and extends from the cylinder aperture. The fourth side of the gland is formed by valve bore 32. The gland dimensions and axial width are chosen to use standard SAE cross-section O-rings and back-up rings (ring set 41) and to accommodate the axial displacement created by the adjustment range (370° as shown). As shown, ring set 41 is SAE-018 size, which mates well with the 1⅛"-24 UNS threads. An example rod style O-ring gland employs AS 568A series O-rings, including those manufactured by Parker Seals™ (see Parker Seals™ Parker O-ring Handbook Catalog ORD 5700A/US, pp. 4-5, 4-6, copyright 1999, 2001 Parker Hannifin Corp.). The combination has more than adequate strength for the typical burst strength requirements. The O-rings in ring set 41 are made from appropriately chosen nitrile materials in 70 and 90 durometers (respectively). The rod style seal format is selected for easiest assembly, least possibility of O-ring spiraling or twisting during installation, and greatest tolerance of the 370° adjustment motion; in this motion the rotation of the valve body moves the stud into the cylinder aperture, the 370 degrees rotation beginning from initial position of the valve body to the final rotational position at which the jam nut locks it in place.

The tube conduit or central bore 43 of the stud connects the valve to the interior of the high pressure cylinder. The stud includes the gas cylinder aperture 70 at its proximal end, the tube aperture 72 at its distal end for connection to the cylinder aperture 74 of the housing 1 in order to provide fluid connection to the housing conduit C. The tube conduit 43 provides fluid communication between the tube gas cylinder aperture 70 and the tube aperture 72. The bore 43 has pressure recovery nozzle 42 to minimize flow loss as the gas makes the 90° turn when transitioning between the stud and valve bores. An optional port feature 44 can be used at the proximal end portion of the stud to adapt discharge nozzles and/or to attach end of line test equipment.

A threaded fastener or jam nut 38 serves to lock the valve body 1 once it is placed in the desired angular position. The stud has a mounting surface adapted to be engaged by a tool for rotating the tube, for example, wrench-flats 36, most typically hexagonal flats, to allow torqueing the stud into a cylinder component or neck. As an example, the typical torque for 1⅛"-12 UNF neck threads is 260 Nm. As the rod seal set 41 is only position sensitive (not torque sensitive) a much lower torque is acceptable for the jam nut (i.e. 80 Nm).

The section of hexagonal flats has a larger external diameter than the rest of the tube. The tube is provided with an O-ring on the external surface of the tube on the proximal side of the section of hexagonal flats such that it abuts that section in order to provide a substantial seal between the valve and the gas cylinder in use. The proximal end of the tube can include threads that engage threads of a component or neck of the gas cylinder. An O-ring 35 serves to seal the stud to the cylinder neck. The seal is in a face seal location, and seats in a gland in the front face of the cylinder neck (not shown). Some cylinder necks use a radial, piston style gland that is inside the cylinder neck, before the stud-threads. Those differences are accommodated by having unique studs for each cylinder neck style.

Valve body 1 includes a housing conduit C or bore extending between inlet/outlet aperture 2 and cylinder aperture 74, which runs the length of the valve body. A threaded bore or port 76 forms part of the housing conduit C, extends from the aperture 2 and is a standardized port form, with its size chosen to match the size of the flow control ball 5. The ball 5 is the flow control part of this ¼ turn valve. As shown, ball 5 has an outer diameter (OD) of, for example, 15.5 mm. It resides in bore 3, which is shown as having a size, for example of 16 mm.

The bore 3 mates to the port 76 and forms part of the housing conduit C. The port 76 ends in a flat bottom 78 to accommodate a ball retainer 12. As shown, a 16 mm size for the bore 3 mates well with the port 76 being sized as an SAE J1926 port in the ¾"-16 UNF version.

The bore 3 terminates at outlet bore 4, which forms part of the housing conduit C and is shown, for example, as an 8 mm bore. Tests confirm the valve's overall geometry is very efficient: its flow is equivalent to an ideal 7.72 mm orifice (i.e. a 93% discharge coefficient).

The bore 4 expands to form EFV bore 26 which forms part of the housing conduit C (e.g., 13.5 mm as shown), and is sized to hold an optional excess flow valve (EFV) 27a. Upwards of the level of the tube bore 43 and live port 31, the excess flow valve (EFV) 27a is provided within the housing conduit C. The EFV is a close fit within the bore 26 of the housing conduit into which it is fitted, the EFV having a diameter which is around 1-100 microns smaller. Any suitable EFV could be used. The part of the housing conduit C which is at the same level as tube aperture and live port 31 is of substantially constant internal diameter and is cylindrical. At the point at which the EFV is fitted there is a small narrowing lead-in chamfer 29 (30° per side as shown), which serves to help install EFV retaining ring 28 into an annular depression at the proximal end of the EFV before a PRD 46 is installed. A PRD bore 30 is a part of the housing conduit C and receives a thermally activated pressure relief device (PRD). The lead-in chamfer provides a smooth transition between the PRD bore 30 and the EFV bore 26. The EFV bore 26 within which the EFV is fitted is slightly narrower than the PRD bore 30, which is at the level of the tube aperture 43 and the live port 31. The EFV bore 26 is of substantially constant internal diameter and is cylindrical. The retaining ring 28 acts as a full-flow stop for the EFV (i.e., it restricts movement of the EFV in a proximal direction). A corresponding seating face on the proximal end of the EFV seats against the retaining ring 28. In the normal, non-triggered state, the EFV is seated against the retaining ring 28.

At the distal end of the EFV (and EFV bore) the housing conduit narrows to form annular step and the narrower outlet bore 4. The outlet bore 4 is too narrow for the EFV to fit into, meaning that the distal end of the EFV seats against the step and its further movement in a distal direction is restricted. A spring 27 serves to calibrate the triggering flow for the EFV.

Figure 3A:
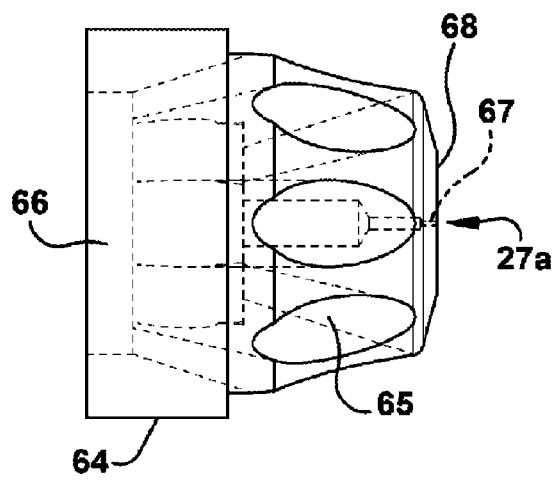
FIGS. 3A and 3B are side and perspective views, respectively, of an EFV of this disclosure.
Figure 3B:
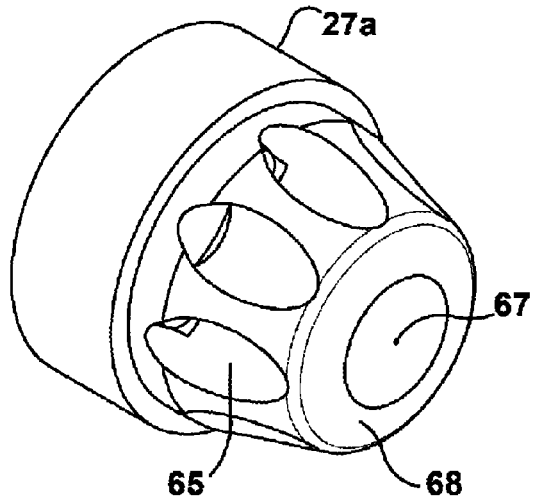

EFV 27a can be more easily visualized in FIG. 3. It has an OD 64 which guides and centers it in the EFV bore 26. Angled holes 65 (e.g., 8 as shown) provide the through-flow path (angled at 18° as shown). Face 68 provides the sealing face when the EFV is triggered and flow is stopped. Bleed orifice 67 (0.25 mm as shown) provides reset flow.

Notably, it is presumed that a thermally activated pressure relief device (PRD) is used to protect the cylinder in the event of a fire. For optimal protection, an aluminum PRD would be used, so that it could gain the most heat from the aluminum valve body.

An advanced, aluminum PRD is shown as PRD 46 (FIG. 1). Any suitable PRD could be used, in particular, a PRD comprised of aluminum (such as models PRD-208 (200 bar), PRD-258 (250 bar), PRD-358 (350 bar), PRD-458 (450 bar) and PRD-758 (700 bar) made by Luxfer Gas Cylinders). As shown, the PRD bore 30 is relatively large (e.g., 14.68 mm) to accommodate a very high flow EFV. That could require the use of an adapter 45 to join and seal the PRD 46 to the bore 30. The adapter is sealed by ring/back-up ring set 47. As shown bore ring set 47 is standard SAE size –013 and is made from appropriately chosen nitrile materials in 70 and 90 durometers, respectively. For lower flow EFVs, or valves with no EFV, the PRD bore 30 would be smaller and the PRD 46 might seal directly in it (i.e. with no adapter 45 and ring set 47).

Figure 4A:
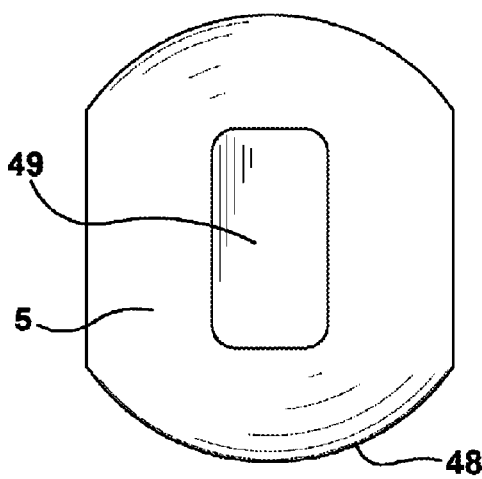
FIGS. 4A and 4B are side and perspective views, respectively, of a flow control ball of this disclosure.
Figure 4B:
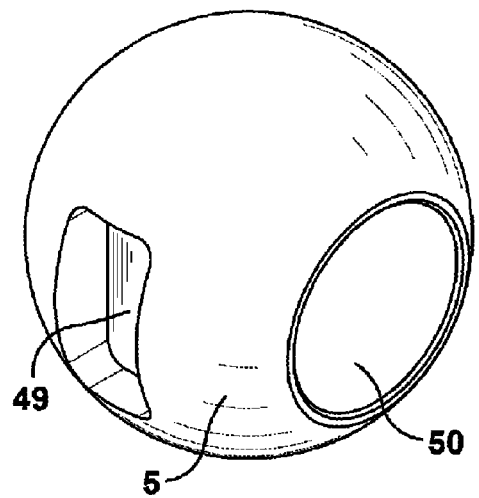

The flow control mechanism, ball 5, is essentially a ball bearing (e.g., 15.5 mm in OD) with a through bore 50 (e.g., 8 mm in diameter). The extremely fine finish and extremely small sphericity errors of commercial ball bearings make them well suited for this purpose. The flow control ball 5 can be more easily visualized in FIG. 4. The ball 5 includes a rectangular, flat-bottomed notch 49 that engages the mating tang on stem 15 as discussed further below.

The OD of the ball 5 seals against two plastic (i.e., polymeric) ball seals 6 and 9. The ball seals 6 and 9 can be more easily visualized in FIG. 5. The sealing surfaces in the plastic ball seals are segments of a sphere (e.g. a spherical radius) having a shape that is closely matched to that of the ball 5. In most cases, seals 6 and 9 are identical. However, some application requirements may dictate different axial thicknesses in order to survive the seating forces when the valve is closed (depending on differential pressure magnitudes and directions).

The seals 6 and 9 are comprised of bearing grade polymeric material including polyetherimide or polyaryletherketone. One suitable polymeric material is KETRON™ PEEK HPV bearing grade, which includes polyether ether ketone (PEEK) additionally comprising polytetrafluoroethylene (TEFLON™ polymer), carbon fiber and graphite. The material is specifically chosen for its high compressive strength (e.g., 184 MPa), low coefficient of friction (e.g., 0.21), low thermal expansion coefficient (e.g., $31 \times 10^{-6}/° K$) and low wear factor (e.g., $200 \times 10^{-10}$). By comparison, the most popular current seal material is Acetal. The chosen material of this disclosure has on the order of: 75% more compressive strength, 16% less friction, ⅓ the thermal expansion and ½ the wear of Acetal. The result is much lower friction (operating torque), greatly reduced leak potential (especially at low temperature), greatly extended life and enhanced over pressure tolerance (especially at high temperatures).

The ball seals 6 and 9 are sealed to the bore 3 by O-rings 7 and 10. A shoulder in each of the ball seals creates a face seal gland 51. As shown, the O-rings 7 and 10 are identical in the SAE-014 size, in a face seal format. While a piston ring style seal could be used, it is harder to install. The bore 3 of the housing conduit includes a flat bottom surface adjacent the bore 4. The O-ring 7 seats against the flat bottom surface of the bore 3.

The bore 3 is in communication with and expands to the greater sized bore 2. The bore 2 has a flat bottom surface that is contacted by an exteriorly threaded seal retainer 12. The O-ring 10 located against the shoulder of the ball seat seats against the bottom of the seal retainer 12. The seal retainer 12 has the same thread size as the port 2 (¾"-16 UNF as shown) and seats against the square bottom of port 2. Thin, precision shim washers 8 and 11 are placed at the top and bottom of the seal—ball-seal stack and serve to create the desired amount of compression or seal-squeeze when the retainer 12 is appropriately torqued against its positive stop. The thickness selected for the shim washers increases as the operating pressure increases. Thus, a 450 bar operating pressure uses thicker shims than a 250 bar unit. The retainer 12 is comprised of, for example, 316 stainless steel (or equivalent).

An exteriorly threaded fastener or jam nut 13 (e.g., comprised of 316 stainless steel) is torqued against the retainer 12 to prevent the retainer from loosening at high pressures and/or high cycles. For example, the retainer 12 is torqued to 35 Nm and jam nut 13 to 50 Nm.

A valve bore 14 extends transverse to and communicates with the bore 3. A valve stem 15 extends through the valve bore 14 and serves to turn the ball 5 90 degrees or ¼ turn between its opened and closed positions. The stem 15 has a rectangular tang 16 which engages the similar tight-fitting rectangular notch in the ball 5. This tang 16 provides positive indexing of the ball to the stem and has higher strength compared to more common, curved-keyway style notches. O-ring/back-up ring set 17 is disposed in a recess of the stem forming a gland 53 and seals the stem 15 to the bore 14. O-ring/back-up ring set 17 is comprised of, for example, appropriately chosen nitrile materials in 70 and 90 durometers respectively, in the SAE standard size −009, as shown.

The stem 15 can be more easily visualized in FIG. 6. The stem 15 includes a stem flange 19 having an interior facing surface 55 and an exterior facing surface 57. The rectangular tang of the stem 16 matches with the notch 49 in the ball 5.

Figure 7:
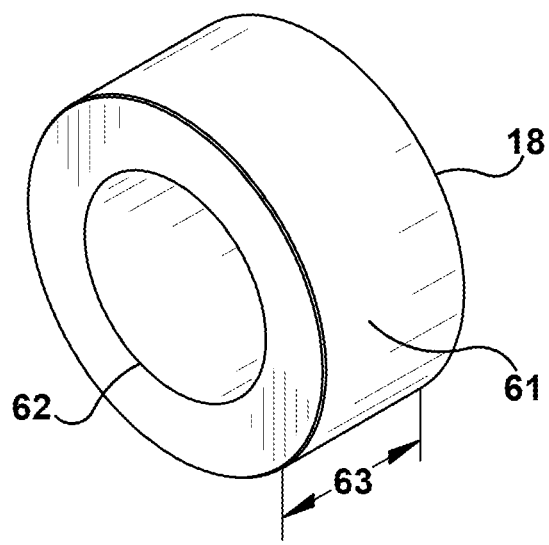
FIG. 7 is a perspective view of a stem bearing of this disclosure.

A ring-shaped stem bearing 18 is disposed around the stem, serves to center and guide the stem 15 and prevents metal-to-metal contact between the stem and the valve bore 14. The bearing 18 can be more easily visualized in FIG. 7. It is basically a plain cylinder with through bore 62, OD 61 and overall length 63. Surface 54 of the stem 15 mates with the ID of the stem bearing 18. The interior facing surface of the stem flange presses against the stem bearing 18.

Figure 8:
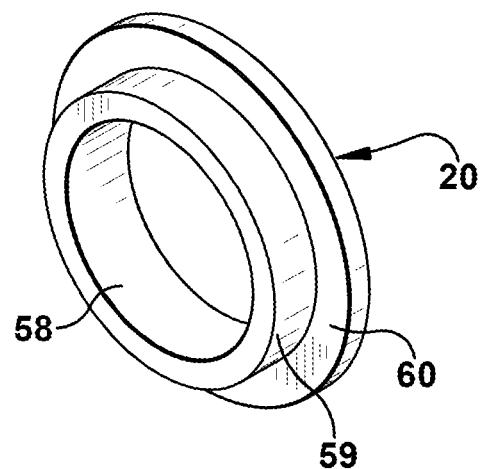
FIG. 8 is a perspective view of a thrust bearing of this disclosure.

An exteriorly threaded stem retainer 21 has a shoulder 80 at a distal end portion including a centered opening 82 that receives the valve stem. The exteriorly facing surface of the stem flange acts against a thrust washer or bearing 20, which engages on the other side, the shoulder 80 of the retainer 21. The thrust bearing 20 acts to both center/guide the stem 15 and to absorb the thrust forces on the stem at high pressures without generating high resistance to turning. The thrust bearing 20 can be more easily visualized in FIG. 8. The thrust bearing has a through bore 58 which mates with an OD of the stem 15. The OD 59 mates with a companion bore in the retainer 21. Shoulder 60 has a width chosen to have adequate compressive strength to accommodate the thrust forces it must absorb. For example, at the maximum fill pressure for a 250 bar natural gas system (310 bar) the thrust force is 1862 Newtons. This system advantageously uses about 1.5 Nm to turn the ball/stem at that pressure (≤26% of current commercial valve's torque).

The stem retainer 21 is comprised of, for example, 316 stainless steel. It serves to absorb the thrust forces from the thrust bearing 20 and centers the stem 15 relative to the valve body and the ball 5. The threads 22 attach the retainer 21 to threads of the valve body located around the valve port 14. Piloting feature or protrusion 23 of the retainer 21 enters a recess 84 in the valve body 1 and centers it relative to both the center and bottom of the ball-bore 3. The thrust bearing 20 has a portion that extends along a length of the stem, through the opening in the stem retainer and presents a bearing surface in contact with a handle or lever 25.

The stem bearing 18 and the thrust bearing 20 are specially chosen, for example, to be comprised of bearing grade polymeric material including polyetherimide or polyaryletherketone. One suitable polymeric material is the KETRON™ PEEK HPV bearing grade material described above in connection with the ball seals 6 and 9. That material is used here for the same reasons it is used in ball-seals 6 and 9 (e.g., long life, low wear, low torque, low coefficient of thermal expansion).

A threaded fastener or nut 24 engages threads on an end portion of the stem to retain handle or lever 25 to the stem 15. A hexagonal socket in the lever 25 engages a mating hexagonal male feature on the stem 15 to transfer the turning torque and to clock the lever correctly relative to the bore through the ball. Per local standards (such as ANSI NGV 3.1) the lever must be perpendicular to the flow direction in the off position.

The valve body 1 optionally may have 1 or 2 cross-drilled ports, commonly referred to as live ports. The live ports are always connected directly to cylinder pressure and cannot be isolated. The live ports would be used, for example, for pressure or temperature gauges or to source gas to remote PRDs. The bore of such an optional live port is seen in FIG. 1 as feature 31. The port 31 can be a standardized port such as SAE J1926-1 ports. As shown, port 31 is a %6"-18 SAE J1926 port. Port 31 is connected to the housing conduit as shown.

Dowel pin 69 provides positive stops for the lever 25 in both the open and closed positions. Spaced apart contoured surfaces of the lever are adapted to engage the dowel pin, which limits the lever to the 90 degree or ¼ turn rotation.

Figure 9:
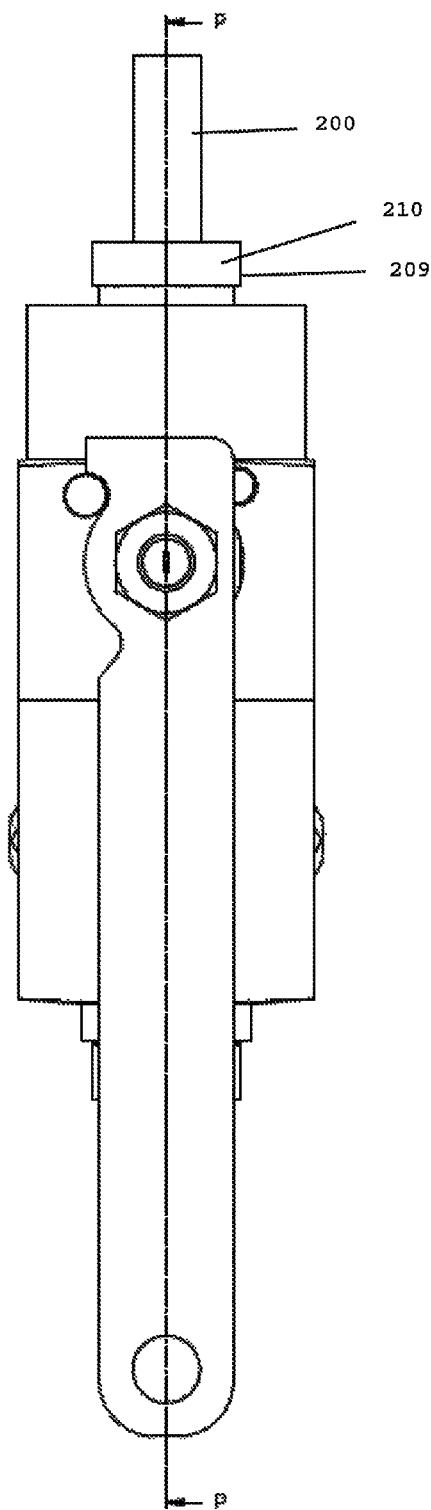
FIG. 9 is an end-on view of a second embodiment of a valve according to this disclosure.
Figure 10:
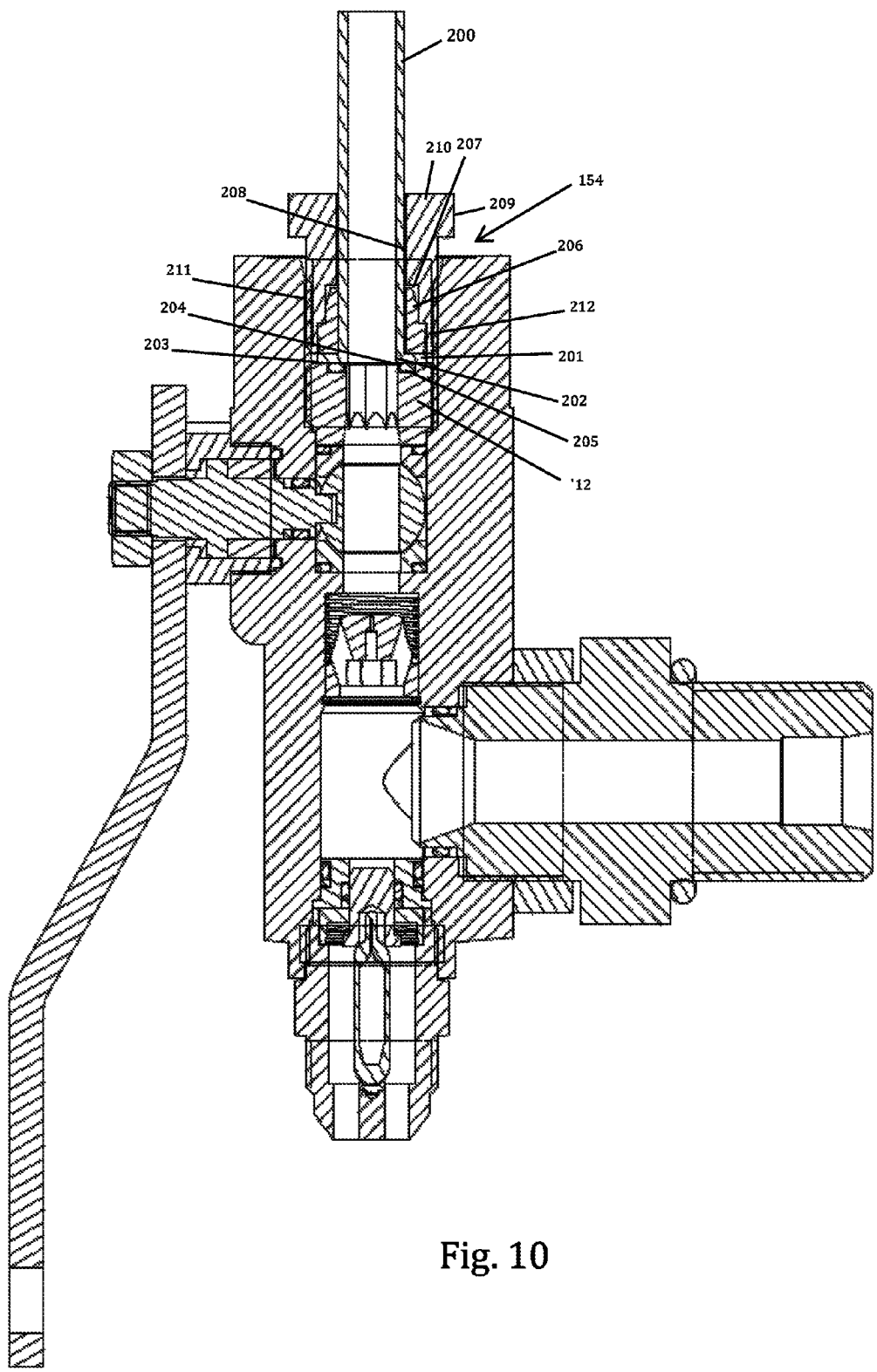
FIG. 10 is a cross-sectional view of the valve of the second embodiment as seen from the lines and arrows P-P of FIG. 9.

FIGS. 9 and 10 depict an end-on view of a side face and a cross-sectional view, respectively, of a valve 1 according to a second embodiment of the disclosure. The valve 1 is identical to the valve of the first embodiment shown in FIGS. 1-8 except that it includes an inlet/outlet port 154 and connection therein having a different configuration. For ease of reference, in FIGS. 9 and 10 only the parts which differ from the parts of FIG. 1-8, respectively, are labelled.

FIG. 10 is a cross-sectional view through line and arrows P-P shown in FIG. 9. To assist in explaining the connection provided by the valve 1 of the second embodiment, in FIG. 10 the valve 1 is depicted with a tube 200 connected to inlet/outlet port or aperture 154. The tube 200 may represent only a portion of a longer tube. The tube 200 mates with the inlet/outlet aperture 154 using the SAE J1453 O-ring Face-Seal format. In this way, and as described in more detail below, the inlet/outlet port 154 provides a female part for mating connection with a male fitting on the end of the tube 200. The male fitting on the end of the tube 200 may be a standardised connection, such as the SAE J1453 O-ring face seal connection depicted in FIG. 10, an SAE J514 (37° flare) connection, SAE J512 (45° flare) connection or a conical metal to metal connection (such as those manufactured by HiP or Autoclave). In some uses, having the inlet/outlet port 154 as a female part may provide a number of advantages including eliminating one fitting and one leak site per outlet pipe, providing a lower cost fitting involving the use of a special tubing nut, and providing a more robust and abuse tolerant connection. In addition, it can provide greater protection for the sealing area from accidents/abuse. This is because the sealing area is inside the valve 1.

The tube 200 comprises outwardly extending flange 201 at tube end 202. The flange 201 seats against a face 203 of seal retainer 12'. The seal retainer 12' is similar to the seal retainer 12 and has all of the characteristics and functions as the seal retainer 12 and additional features of the second embodiment. The seal retainer 12' seats against the bottom of port 154. Annular depression 204 is provided in the face 203 of the seal retainer 12', and an O-ring 205 is provided in the depression 204. In this way, the O-ring 205 seals against flange 201. Male gland 206 is fitted around the tube 200 such that it seats against flange 201. Tubing nut 210 is fitted around the tube 200 at the opposite end of male gland 206 to flange 201. The end of the tubing nut 210 which, in use, is closest to flange 201 is provided with an annular gap 207 on its internal surface. Annular gap 207 is shaped to mate with the external surface of male gland 206. As the tubing nut 210 extends distally from male gland 206, it then comprises narrow section 208 which is a close fit around tube 200. Tubing nut 210 is provided with screw threads 212 on its external surface which are shaped to mate with corresponding screw threads 211 provided on the internal surfaces of the inlet/outlet port 154. At the end of the tubing nut 210 which is furthest from the flange 201, there are provided hexes 209, i.e., a section of hexagonal cross-section, for engagement by a suitable tool (not shown) in order to assist in screwing the tubing nut 210 into the inlet/outlet port 154. As is known in the art, other cross-sectional shapes could provide similar functionality. It is generally preferred for the type of connection shown in FIGS. 9 and 10 that the thread sizes for the threads 211 and 212 should be at least one thread size larger (typically $\frac{1}{16}$") than the standard SAE threads. This allows the use of a thicker tubing nut 210. The tube end 202, the gland 206 and the tubing nut 210 lock the seal retainer 12' in place. The tubing nut 210 (e.g., comprised of 316 stainless steel) is torqued against the seal retainer 12' to prevent the retainer from loosening at high pressures and/or high cycles. For example, the seal retainer 12' is torqued to 35 Nm and the tubing nut 210 to 50 Nm.

The inlet/outlet port 154 connection shown in FIGS. 9 and 10 can be adapted to any desired flow capacity and tubing size. In some embodiments, the flow capacity may be so high as to force the valve to get bigger. In FIGS. 9 and 10, the valve is sized for a ¾" tube 200 to allow the plumbing of several valves in series. More typically, the valve size would use a ⅜" or 10 mm tube. The use of a much larger tube would require a correspondingly larger inlet/outlet port 154. As shown, the valve has a 8 mm thru bore, which is perfectly sized for a ⅜" or 10 mm inlet tube 200. The ball retainer 12' and tubing nut 210 both have ¾"-16 threads, for example. If larger tubing and flow capacities are needed, the ball and its through bore would be even larger, as would the port/tubing nut threads and tube size.

Many modifications and variations will be apparent to those of ordinary skill in the art in light of the foregoing disclosure. Therefore, it is to be understood that, within the scope of the appended claims, the subject matter of the disclosure can be practiced otherwise than has been specifically shown and described.

What is claimed is:

1. A valve for connection to a pressurized gas cylinder, the valve comprising:
   a housing comprising a gas cylinder aperture which is connectable to a gas cylinder, and a housing conduit which extends through the housing from the gas cylinder aperture to one or more inlet/outlet apertures so that the valve is capable of providing fluid communication between the gas cylinder through the housing conduit and the one or more inlet/outlet apertures;
   a flow control ball within the housing conduit which is movable from a closed position in which it substantially seals the housing conduit to an open position which provides fluid communication through the housing conduit between the cylinder aperture and the one or more inlet/outlet apertures;
   ball seals having sealing surfaces corresponding to a shape of said flow control ball for substantially sealing said flow control ball in the housing conduit, wherein said ball seals comprise polyetherimide or polyaryletherketone; and
   a tube which is removably connectable from the rest of the housing, said tube having a first threaded end portion that engages threads of a component of the gas cylinder and a second threaded end portion of finer threads that engage a threaded portion of the gas cylinder aperture, a mounting surface for engaging said tube with a tool for rotating said tube and a fastener having threads that engage said finer threads for locking said tube and the housing together at a desired angular position of the housing, wherein said tube includes a non-threaded portion disposed more internally in said housing than said second threaded end portion, and a seal disposed at said non-threaded portion;
   wherein the housing is formed at least partially from aluminum.

2. A valve as claimed in claim 1 wherein the housing conduit includes a threaded bore extending from one of said inlet/outlet apertures that terminates in a flat bottom, comprising an exteriorly threaded seal retainer that engages the threads of said threaded bore and contacts said flat bottom, and a seal disposed between said seal retainer and an adjacent one of said ball seals.

3. A valve as claimed in claim 1 comprising a valve stem for turning said flow control ball between the open position and the closed position, wherein said flow control ball includes a rectangular notch that is engaged by a rectangular portion of said valve stem.

4. A valve as claimed in claim 1 adapted to be used with the valve cylinder containing natural gas or hydrogen.

5. A valve as claimed in claim 1 comprising a valve stem for turning said flow control ball between the open position and the closed position, a valve bore in communication with the housing conduit, said stem extending through said valve bore, wherein said valve stem includes a stem flange, at least one O-ring disposed between said valve stem and said valve bore for substantially sealing said valve stem to said valve bore, a threaded stem retainer that engages threads formed in the housing around said valve bore and includes a shoulder and an opening in said shoulder that receives said valve stem, a stem bearing disposed around said valve stem between an interior facing surface of said stem flange and said valve body and a thrust bearing disposed around said valve stem between an exterior facing surface of said stem flange and said shoulder of said stem retainer.

6. A valve as claimed in claim 5 wherein said stem bearing and said thrust bearing comprise polyetherimide or polyaryletherketone.

7. A valve as claimed in claim 6 wherein said stem bearing and said thrust bearing comprise polyether ether ketone (PEEK) polymer, carbon, graphite and polytetrafluoroethylene.

8. A valve as claimed in claim 5 comprising a handle mounted to said valve stem adapted to rotate said valve stem and said flow control ball by 90 degrees.

9. A valve as claimed in claim 1 wherein said ball seals comprise polyether ether ketone (PEEK) polymer, carbon, graphite and polytetrafluoroethylene.

10. A valve as claimed in claim 1 including at least one live port extending transverse to the housing conduit.

11. A valve as claimed in claim 1 wherein the housing conduit includes an excess flow bore, comprising an excess flow valve (EFV) provided in the excess flow bore.

12. A valve as claimed in claim 1 wherein the housing conduit communicates with a thermal pressure relief aperture, comprising a thermal pressure relief device (PRD) fitted into the pressure relief aperture.

13. A valve for connection to a pressurized gas cylinder, the valve comprising:
    a housing comprising a gas cylinder aperture which is connectable to a gas cylinder, and a housing conduit which extends through the housing from the gas cylinder aperture to one or more inlet/outlet apertures so that the valve is capable of providing fluid communication between the gas cylinder through the housing conduit and the one or more inlet/outlet apertures;

a flow control ball within the housing conduit which is movable from a closed position in which it substantially seals the housing conduit to an open position which provides fluid communication through the housing conduit between the cylinder aperture and the one or more inlet/outlet apertures;

ball seals having sealing surfaces corresponding to a shape of said flow control ball for substantially sealing said flow control ball in the housing conduit, wherein said ball seals comprise polyetherimide or polyaryletherketone;

wherein the housing is formed at least partially from aluminum;

wherein the housing conduit includes a threaded bore extending from one of said inlet/outlet apertures that terminates in a flat bottom, comprising an exteriorly threaded seal retainer that engages the threads of said threaded bore and contacts said flat bottom, and a seal disposed between said seal retainer and an adjacent one of said ball seals; and a threaded fastener that engages the threads of said threaded bore in contact with said seal retainer for locking said seal retainer in position.

14. A valve as claimed in claim 13 comprising a shim disposed between said seal retainer and said adjacent one of said ball seals, wherein said seal is an O-ring and said shim compresses said O-ring by a desired amount.

15. A valve for connection to a pressurized gas cylinder, the valve comprising:

a housing comprising a gas cylinder aperture which is connectable to a gas cylinder, and a housing conduit which extends through the housing between the gas cylinder aperture and one or more inlet/outlet apertures so that the valve is capable of providing fluid communication between the gas cylinder through the housing conduit and the one or more inlet/outlet apertures;

a flow control ball within the housing conduit which is movable from a closed position in which it substantially seals the housing conduit to an open position which provides fluid communication through the housing conduit between the cylinder aperture and the one or more inlet/outlet apertures;

ball seals having sealing surfaces corresponding to a shape of said flow control ball for substantially sealing said flow control ball in the housing conduit;

wherein the housing conduit includes a threaded bore extending from one of said inlet/outlet apertures that terminates in a flat bottom, an exteriorly threaded seal retainer that engages the threads of said threaded bore and contacts said flat bottom, and an O-ring disposed between said seal retainer and an adjacent one of said ball seals;

a threaded fastener that engages the threads of said threaded bore in contact with said seal retainer for locking said seal retainer in position;

a valve bore in communication with the housing conduit;

a valve stem extending through said valve bore for turning said flow control ball between the open position and the closed position, said valve stem including a stem flange;

at least one O-ring disposed between said valve stem and said valve bore for substantially sealing said valve stem to said valve bore;

a threaded stem retainer that engages threads formed in the housing around said valve bore and includes a shoulder and an opening in said shoulder that receives said valve stem;

a stem bearing disposed around said valve stem between an interior facing surface of said stem flange and the housing; and a thrust bearing disposed around said valve stem between an exterior facing surface of said stem flange and said shoulder of said stem retainer.

16. A valve as claimed in claim 15 wherein at least one of said ball seals, said stem bearing and said thrust bearing comprise polyetherimide or polyaryletherketone.

17. A valve as claimed in claim 15 wherein said ball seals, said stem bearing and said thrust bearing comprise polyether ether ketone (PEEK) polymer, carbon, graphite and polytetrafluoroethylene.

18. A valve as claimed in claim 15 comprising a handle mounted to said valve stem adapted to rotate said valve stem and said flow control ball by 90 degrees.

19. A valve as claimed in claim 15 wherein the housing is formed at least partially from aluminum.

20. A valve as claimed in claim 15 comprising a shim disposed between said seal retainer and the adjacent one of said ball seals for compressing said O-ring by a desired amount.

21. A valve as claimed in claim 15 adapted to be used with the gas cylinder containing natural gas or hydrogen.

22. A valve as claimed in claim 15 adapted to be used with the gas cylinder at pressures of up to 700 bar.

23. A valve as claimed in claim 15 comprising a tube which is removably connectable from the rest of the housing, said tube having a first threaded end portion that engages threads of a component of the gas cylinder and a second threaded end portion of finer threads that engage a threaded portion of the gas cylinder aperture, a mounting surface for engaging said tube with a tool for rotating said tube and a fastener having threads that engage said finer threads for locking said tube and the housing together at a desired angular position of the housing.

24. A valve as claimed in claim 15 including at least one live port extending transverse to the housing conduit.

25. A valve as claimed in claim 15 wherein the housing conduit includes an excess flow bore, comprising an excess flow valve (EFV) provided in the excess flow bore.

26. A valve as claimed in claim 15 wherein the housing conduit communicates with a thermal pressure relief aperture, comprising a thermal pressure relief device (PRD) fitted into the pressure relief aperture.

27. A valve as claimed in claim 15, wherein said flow control ball includes a rectangular notch that is engaged by a rectangular portion of said valve stem.

\* \* \* \* \*